US008239199B2

(12) United States Patent
Bhamidipati

(10) Patent No.: US 8,239,199 B2
(45) Date of Patent: Aug. 7, 2012

(54) REPLACING AN AUDIO PORTION

(75) Inventor: Narayan Lakshmi Bhamidipati, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 498 days.

(21) Appl. No.: 12/580,255

(22) Filed: Oct. 16, 2009

(65) Prior Publication Data

US 2011/0093270 A1 Apr. 21, 2011

(51) Int. Cl.
*G10L 15/04* (2006.01)

(52) U.S. Cl. ......................... 704/254; 704/243; 704/244

(58) Field of Classification Search .................. 704/200, 704/203, 204, 205, 231, 243, 244, 254, 226, 704/270
See application file for complete search history.

(56) References Cited

U.S. PATENT DOCUMENTS 8,140,326 B2 * 3/2012 Chen et al. .................... 704/226

* cited by examiner

*Primary Examiner* — Huyen X. Vo
(74) *Attorney, Agent, or Firm* — Evergreen Valley Law Group, P.C.; Kanika Radhakrishnan

(57) ABSTRACT

A method includes identifying a first syllable in a first audio of a first word and a second syllable in a second audio of a second word, the first syllable having a first set of properties and the second syllable having a second set of properties; detecting the first syllable in a first instance of the first word in an audio file, the first syllable in the first instance having a third set of properties; determining one or more transformations for transforming the first set of properties to the third set of properties; applying the one or more transformations to the second set of properties of the second syllable to yield a transformed second syllable; and replacing the first syllable in the first instance of the first word with the transformed second syllable in the audio file.

19 Claims, 6 Drawing Sheets

REPLACING AN AUDIO PORTION

BACKGROUND

Over a period of time, use of multimedia content, for example audio and video content has increased. Often, a user might desire to edit a multimedia file for various purposes, for example for removing an offensive word. Currently, techniques exist to mute a portion of the multimedia file including the offensive word. However, muting leads to silence which may not be desired by the user. Another technique is to overwrite the portion with another audio portion including another word. However, overwriting may not yield a good quality due to difference in properties of the portion including the offensive words and the audio portion. Further, the quality worsens with increase in difference in the properties.

SUMMARY

An example of a method includes identifying, electronically, a first syllable in a first audio of a first word and a second syllable in a second audio of a second word, the first syllable having a first set of properties and the second syllable having a second set of properties. The method also includes detecting, electronically, the first syllable in a first instance of the first word in an audio file, the first syllable in the first instance of the first word having a third set of properties. The method further includes determining, electronically, one or more transformations for transforming the first set of properties of the first syllable in the first audio to the third set of properties in the first syllable in the first instance of the first word. Moreover, the method includes applying, electronically, the one or more transformations to the second set of properties of the second syllable to yield a transformed second syllable. Furthermore, the method includes replacing, electronically, the first syllable in the first instance of the first word with the transformed second syllable in the audio file.

An example of an article of manufacture includes a machine-readable medium, and instructions carried by the medium and operable to cause a programmable processor to perform identifying a first syllable in a first audio of a first word and a second syllable in a second audio of a second word, the first syllable having a first set of properties and the second syllable having a second set of properties. The instructions also cause the programmable processor to perform detecting the first syllable in a first instance of the first word in an audio file, the first syllable in the first instance of the first word having a third set of properties. The instructions further cause the programmable processor to perform determining one or more transformations for transforming the first set of properties of the first syllable in the first audio to the third set of properties in the first syllable in the first instance of the first word. Moreover, the instructions cause the programmable processor to perform applying the one or more transformations to the second set of properties of the second syllable to yield a transformed second syllable. Furthermore, the instructions cause the programmable processor to perform replacing the first syllable in the first instance of the first word with the transformed second syllable in the audio file.

An example of a system includes a communication interface in electronic communication with a hardware element to receive an audio input including a first word and a second word. The system also includes a storage device that stores an audio file. Further, the system includes a processor responsive to the audio input to identify a first syllable in a first audio of the first word and a second syllable in a second audio of the second word, the first syllable having a first set of properties and the second syllable having a second set of properties; detect the first syllable in a first instance of the first word in the audio file, the first syllable in the first instance of the first word having a third set of properties; determine one or more transformations for transforming the first set of properties of the first syllable in the first audio to the third set of properties in the first syllable in the first instance of the first word; apply the one or more transformations to the second set of properties of the second syllable to yield a transformed second syllable; and replace the first syllable in the first instance of the first word with the transformed second syllable in the audio file.

Another example of a method includes receiving, electronically, a first audio of a first word and a second audio of a second word. The method also includes detecting, electronically, at least one instance of the first word in an audio file. The method further includes applying, electronically, properties associated with the at least one instance of the first word in the audio file to the second word. Moreover, the method includes replacing, electronically, the at least one instance of the first word in the audio file with the second word having applied properties.

DETAILED DESCRIPTION OF THE EMBODIMENTS

Figure 1:
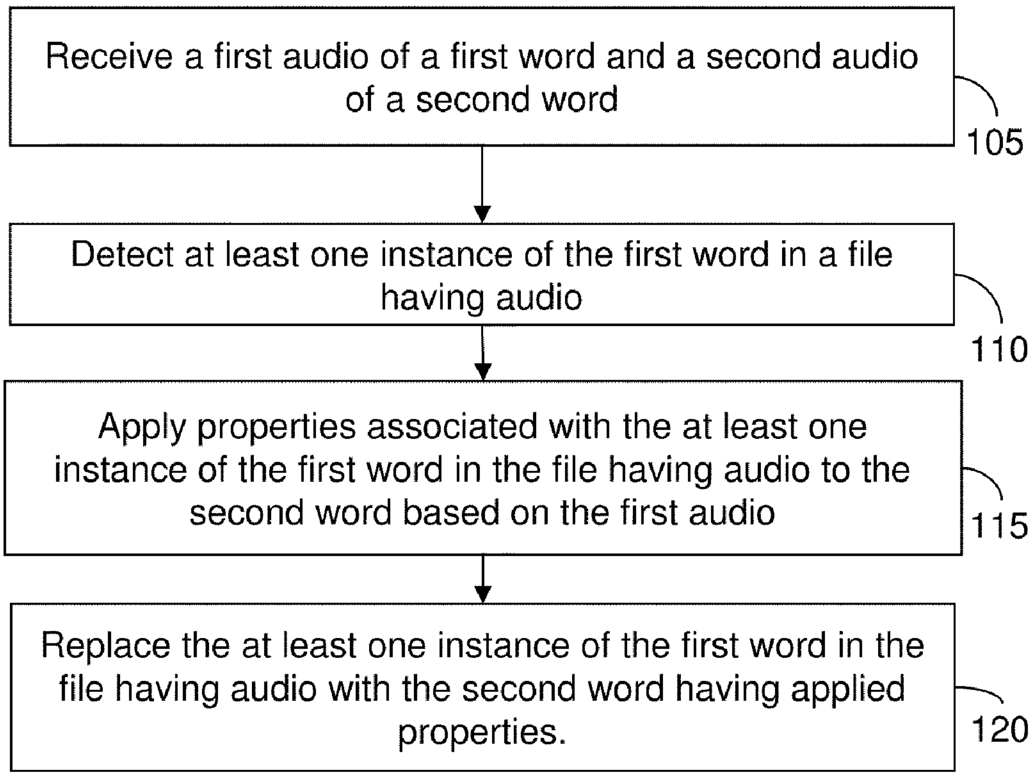
FIG. 1 is a flowchart illustrating a method, in accordance with one embodiment.

FIG. 1 is a flowchart illustrating a method, in accordance with one embodiment.

At step 105, an audio of a first word and an audio of a second word are received. The audios of the first word and the second word can be in one file or multiple files. Examples of the file include, but are not limited to, an audio file, a video file and a multimedia file. The audios are accessible or received by an application running on a processor. The audios can correspond to voice of one entity. The entity can refer to a living organism or a machine that generates voice.

In one example, text of the first word and the second word can be received and processed by a text to audio conversion technique to generate the audios. In another example, the audios can be received through electronic devices, for example a microphone. The audios can also be received from an external or internal storage device. The audios can also be received from electronic devices, for example computers and telephones, located remotely to the processor through a network, for example through internet and other communication medium, for example wired connections, wireless connections and Bluetooth.

The first word and the second word can also be a combination of one or more words. For example, the first word can be "United States".

At step 110, at least one instance of the first word in another file having audio is detected. The file can be accessed from any external or internal storage device. The file can also be accessed through a network, for example through internet and other communication medium, for example wired connections, wireless connections and Bluetooth.

At step 115, properties associated with the instance of the first word in the file having audio is applied to the second word based on the first audio of the first word. Examples of the properties include, but are not limited to, pitch, timbre, loudness, tone, speed of utterance, amplitude, frequency, time duration and tempo.

In some embodiments, the properties associated with the instance of the first word, properties associated with the first word in the first audio, and properties associated with the second word are identified. One or more transformations for transforming the properties associated with the first word to the properties associated with the instance of the first word can then be determined. The transformations can then be applied to the properties associated with the second word to yield a transformed second word.

At step 120, the instance of the first word in the file having audio is replaced with the transformed second word. The transformed second word has properties similar to that of the first instance of the first word to a maximal extent and hence, characteristics are preserved while replacement.

Several instances of the first word can be detected in the file having audio. Each instance may have different properties. Steps 110 to 120 can be performed for each instance.

Figure 2:
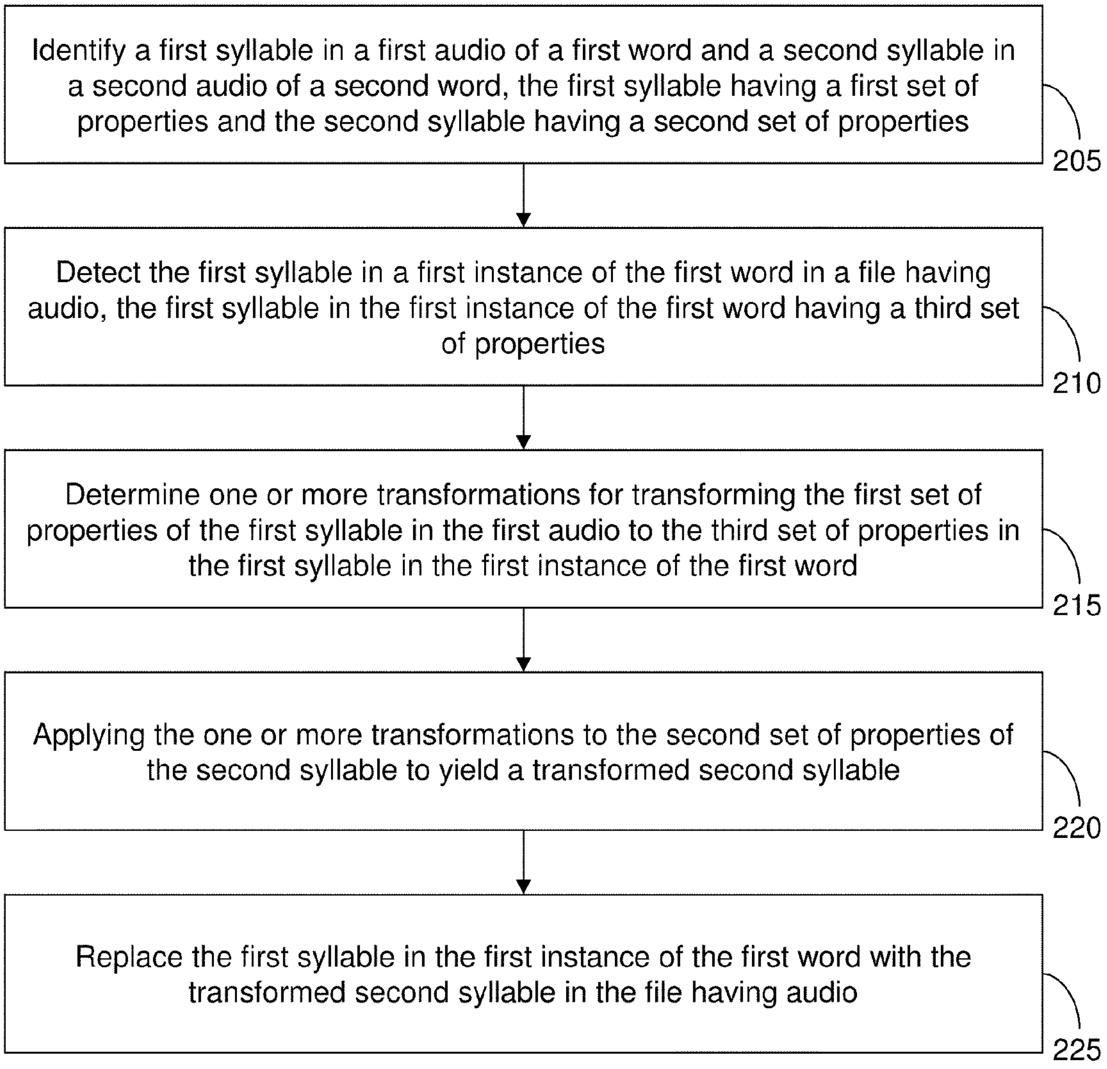
FIG. 2 is a flowchart illustrating a method for replacing a first word with a second word, based on syllables, in a file, in accordance with one embodiment.

The detecting and applying can be performed in various ways, for example as explained in conjunction with FIG. 2.

Referring to FIG. 2, the first audio of the first word and the second audio of the second word are accessed at step 205. The first word and the second word may have either similar number of syllables or different number of syllables. A first syllable in the first audio of the first word and a second syllable in the second audio of the second word are identified. The first syllable has a first set of properties and the second syllable has a second set of properties.

It is noted that step 205 is repeated for identifying each syllable of the first word and each syllable of the second word.

Various techniques can be used for identifying syllables. Examples of the techniques include, but are not limited to, a technique described in a publication titled "*Syllable detection in read and spontaneous speech*" by Hartmut R. Pfitzinger, Susanne Burger, Sebastian Heid, of Institut fur Phonetik and Sprachliche Kommunikation, University of Munich, Germany; and in a publication titled "*Syllable detection and segmentation using temporal flow neural networks*" by Lokendra Shastri, Shuangyu Chang, Steven Greenberg of International Computer Science Institute, which are incorporated herein by reference in their entirety.

Sound of consonants and sound of vowels are also identified in the first syllable in the first audio and in the second syllable in the second audio. The sound of vowels and sound of consonants can be identified using various techniques, for example a technique described in a publication titled "*Robust Acoustic-Based Syllable Detection*" by Zhimin Xie, Partha Niyogi of Department of Computer Science University of Chicago, Chicago, Ill.; in a publication titled "*Vowel landmark detection*" by A W Howitt, submitted on 15 Jan. 1999 to Eurospeech 99, the 6th European Conference on Speech Communication and Technology, 5-10 Sep. 1999, Budapest, Hungary, organized by ESCA, the European Speech Communication Association; in a publication titled "*Detection of speech landmarks: Use of temporal information*" by Ariel Salomon, Carol Y. Espy-Wilson, and Om Deshmukh in *The Journal of the Acoustical Society of America,* 2004; and in a publication titled "*Speech recognition based on phonetic features and acoustic landmarks*" by Amit Juneja in Pages: 169 Year of Publication: 2004 ISBN: 0-496-13166-4, Order Number: AAI3152591, ACM, which are incorporated herein by reference in their entirety.

At step 210, the file having audio is accessed and a first instance of the first word is detected. The first instance of the first word in the file having audio has a third set of properties. The first set of properties and the third set of properties might differ from each other in at least one property, for example frequency, amplitude, time duration and so on. The first instance of the first word in the file having audio can be detected using various techniques, for example using the techniques provided in the URL "http://liceu.uab.es/~joaquim/speech_technology/tecnol_parla/recognition/refs_reconeixement.html", which are incorporated herein by refere nce in their entirety.

The first syllable is also detected in the first instance. The sound of consonants and sound of vowels are also identified in the first syllable in the first instance.

At step 215, one or more transformations for transforming the first set of properties of the first syllable in the first audio to the third set of properties in the first syllable in the first instance of the first word are determined. The transformations include a transformation function corresponding to each property that differs in the first set of properties and the third set of properties.

The mapping of the sound of consonants and sound of vowels in the first syllable in the first audio and in the first syllable in the first instance is then performed to obtain the transformation functions for various properties. The mapping can be performed using various techniques, for example fuzzy mapping techniques, string mapping, and a technique described in publication titled "*SUBSPACE BASED VOWEL-CONSONANT SEGMENTATION*" by R. Muralishankar, A. Vijaya Krishna and A. G. Ramakrishnan in 2003 IEEE workshop on statistical signal processing, Sep. 28-Oct. 1, 2003, St. Louis, USA, pp. 589-592, which is incorporated herein by reference in its entirety.

At step 220, the transformations are applied to the second set of properties of the second syllable to yield a transformed second syllable. The transformation functions for various properties determined at step 215 are applied to the second syllable of the second word.

In some embodiments, the applying includes one or more of: multiplying or adding a constant factor to amplitude of the second syllable to make amplitude of the second syllable similar to that of the first syllable in the first instance; dilating or constricting or altering time duration of the second syllable to make time duration of the second syllable similar to that of the first syllable in the first instance; truncating duration of sound of vowel in the second syllable to make duration of the sound of vowel in the second syllable similar to that of the first syllable in the first instance; and altering or shifting frequency of the second syllable to make frequency of the second syllable similar to that of the first syllable in the first instance. The amplitude associated with or of a syllable can be defined as amplitude of an audio signal of the syllable. The time duration of the syllable and of the sound of vowel can also be defined as the time duration of the audio signal of the syllable and of the sound of the vowel respectively. The frequency can be defined as inverse of duration of a wave. The wave can correspond to the audio signals of the syllables. The frequency can be obtained by using various transformations, for example Fourier transform, wavelet transform. The altering of the frequency cab be done using various techniques, for example a technique described in a publication titled "*Frequency Shifts and Vowel Identification*" by Peter F. Assmann, Terrance M. Nearey of University of Texas at Dallas, Richardson, Tex. 75083, USA and University of Alberta, Edmonton, AB, T6G 2E7, Canada respectively.

At step 225, the first syllable in the first instance of the first word in the file having audio is replaced with the transformed second syllable. The transformed second syllable has characteristics mapping, to a maximal extent, to that of the first syllable in the first instance.

Steps 210 to 215 are performed for each syllable in the first word.

Steps 220 to 225 are performed for each syllable in the second word.

Steps 210 to 225 are also performed for each instance of the first word in the file having audio.

In one embodiment, the first word can have more syllables than that in the second word. For example, the first word can have two syllables and the second word can have one syllable. In such scenarios two transformation matrices can be determined corresponding to the two syllables in the first instance of the first word. The two transformation matrices can be applied to the syllable of the second word to generate two occurrences of the syllable, of the second word, but with different set of properties. A first occurrence having properties similar to that of a first one of the two syllables in the first instance of the first word, and a second occurrence having properties similar to that of a second one of the two syllables in the first instance of the first word. The first one of the two syllables in the first instance of the first word can be replaced with the first occurrence and the second one of the two syllables in the first instance of the first word can be replaced with the second occurrence.

In another embodiment, each of the first word and the second word can have equal number of syllables. A syllable to syllable replacing can then be performed using steps described in FIG. 2.

In yet another embodiment, the second word can have more syllables than that in the first word. For example, the second word can have two syllables and the first word can have one syllable. In such scenarios a third syllable in the second audio of the second word is also identified, in addition to, the second syllable. The third syllable has a fourth set of properties. The transformations are applied to both the second syllable and the third syllable to yield the second transformed syllable and a third transformed syllable. The first instance of the first word is replaced with the second transformed syllable and the third transformed syllable. The time duration of the second transformed syllable and the third transformed syllable can together be equivalent to that of the first instance of the first word.

It is noted that the method described in FIG. 2 can be extended to phrases and sentences. A syllable by syllable or word by word mapping and replacement can be performed.

Figure 3A:
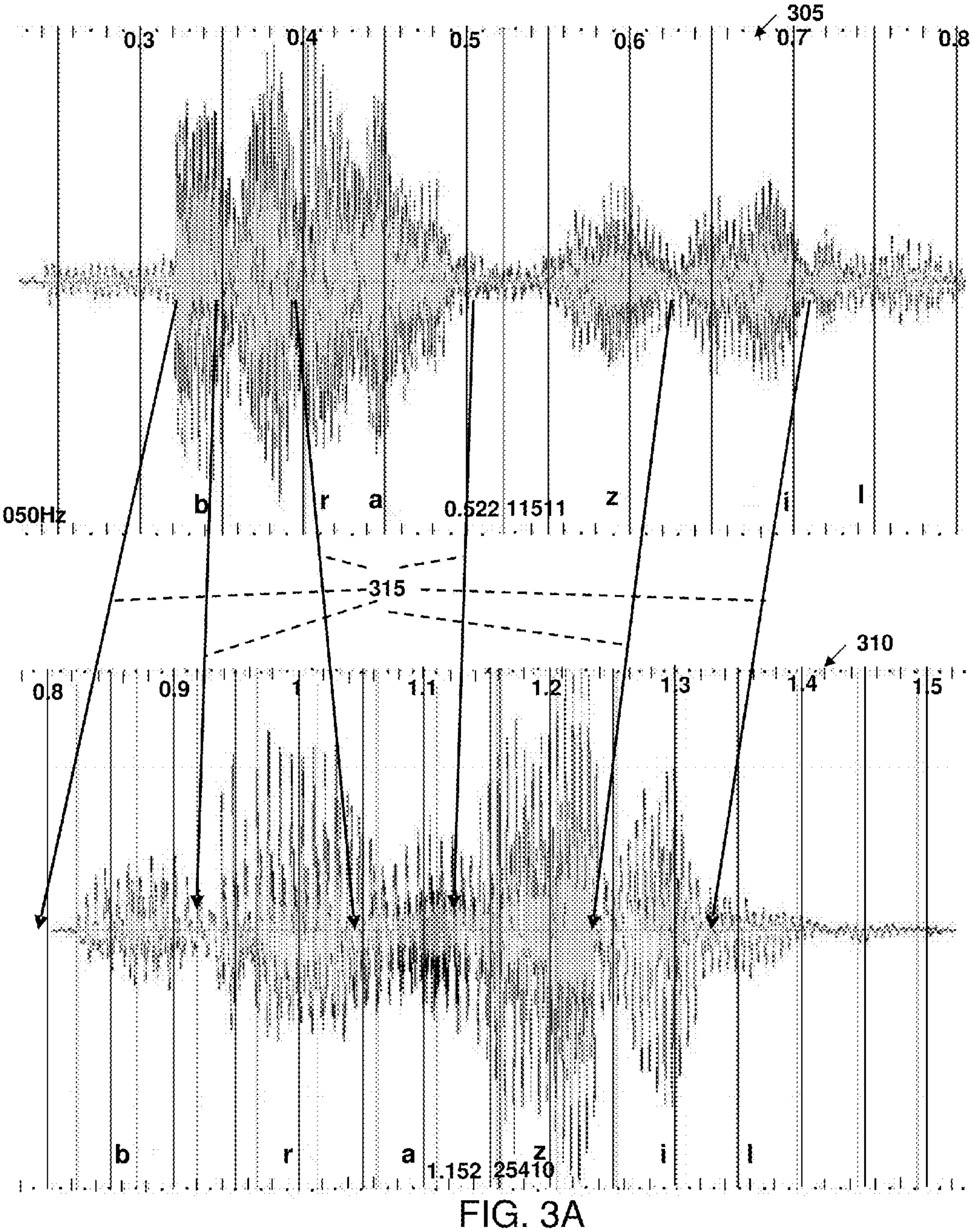
FIG. 3*a* is a graphical representation illustrating syllable mapping of the first word, for example Brazil, in the first audio and in the first instance of the first word in the file having audio, in accordance with one embodiment.

FIG. 3*a* is a graphical representation illustrating syllable mapping of the first word, for example Brazil in the first audio and in the first instance of the first word in the file having audio. A waveform 310 corresponds to the first audio of the first word and a waveform 305 corresponds to the first instance of the first word in the file having audio. The waveform 305 and the waveform 310 indicate different set of properties, for example the waveform 305 corresponds to a female speaker and the waveform 310 corresponds to a male speaker. Arrows 315 indicates mapping of points in the waveform 305 to that in the waveform 310 to obtain the transformations.

Figure 3B:
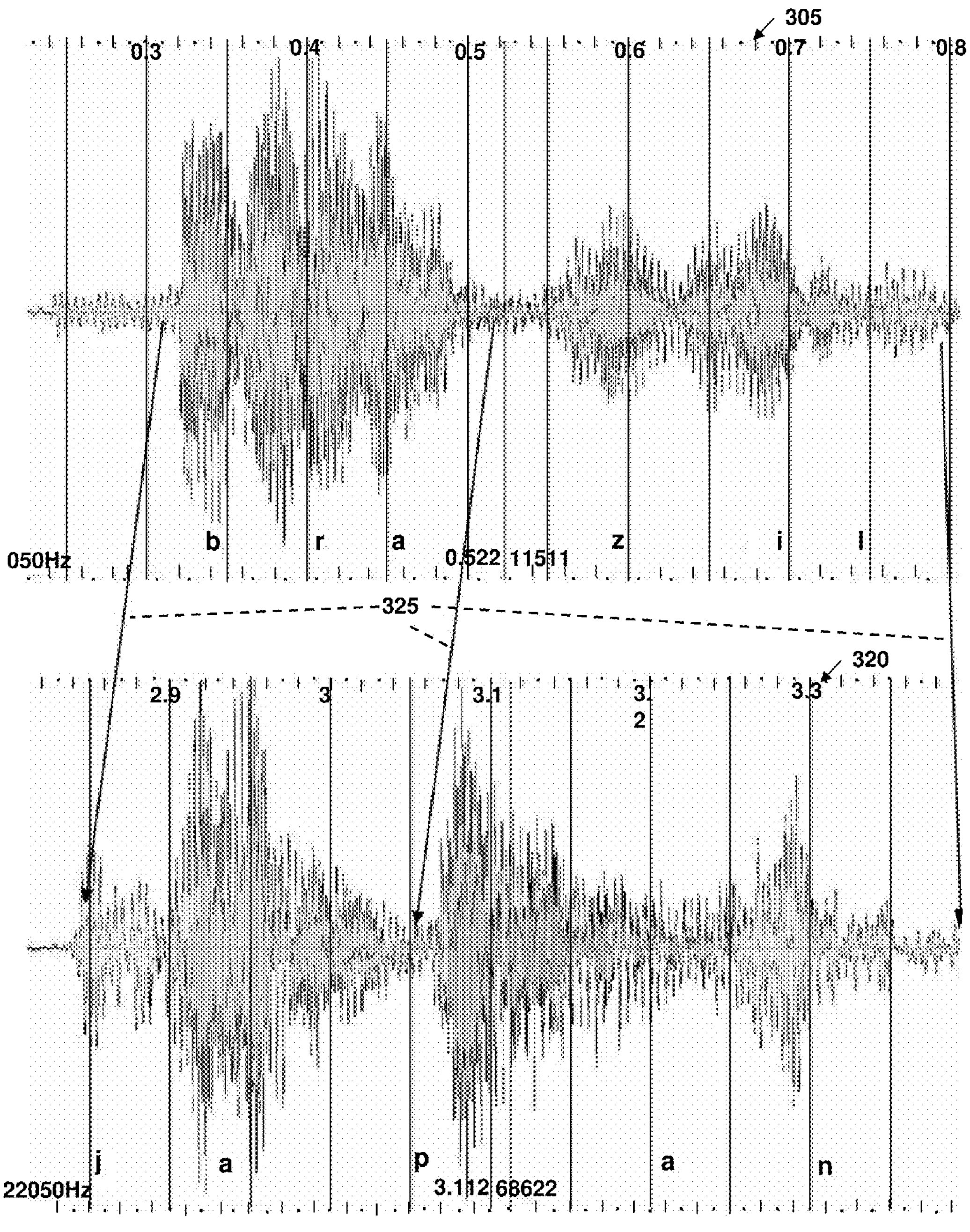
FIG. 3*b* is a graphical representation illustrating syllable mapping of the second word, for example Japan, in the second audio and of the first instance of the first word, for example Brazil, in the in the file having audio, in accordance with one embodiment.

FIG. 3*b* is a graphical representation illustrating syllable mapping of the second word, for example Japan, in the second audio and of the first instance of the first word, for example Brazil, in the in the file having audio. The first word Brazil and the second word Japan have same number of syllables. A waveform 320 corresponds to the second audio of the second word. The waveform 305 and the waveform 320 have different set of properties, for example the waveform 305 corresponds to the first instance of the first word spoken by the female speaker and the waveform 310 corresponds to the second word spoken by the male speaker. Arrows 315 indicates mapping of points in the waveform 305 to that in the waveform 320 using the transformations to yield a transformed second word.

Figure 3C:
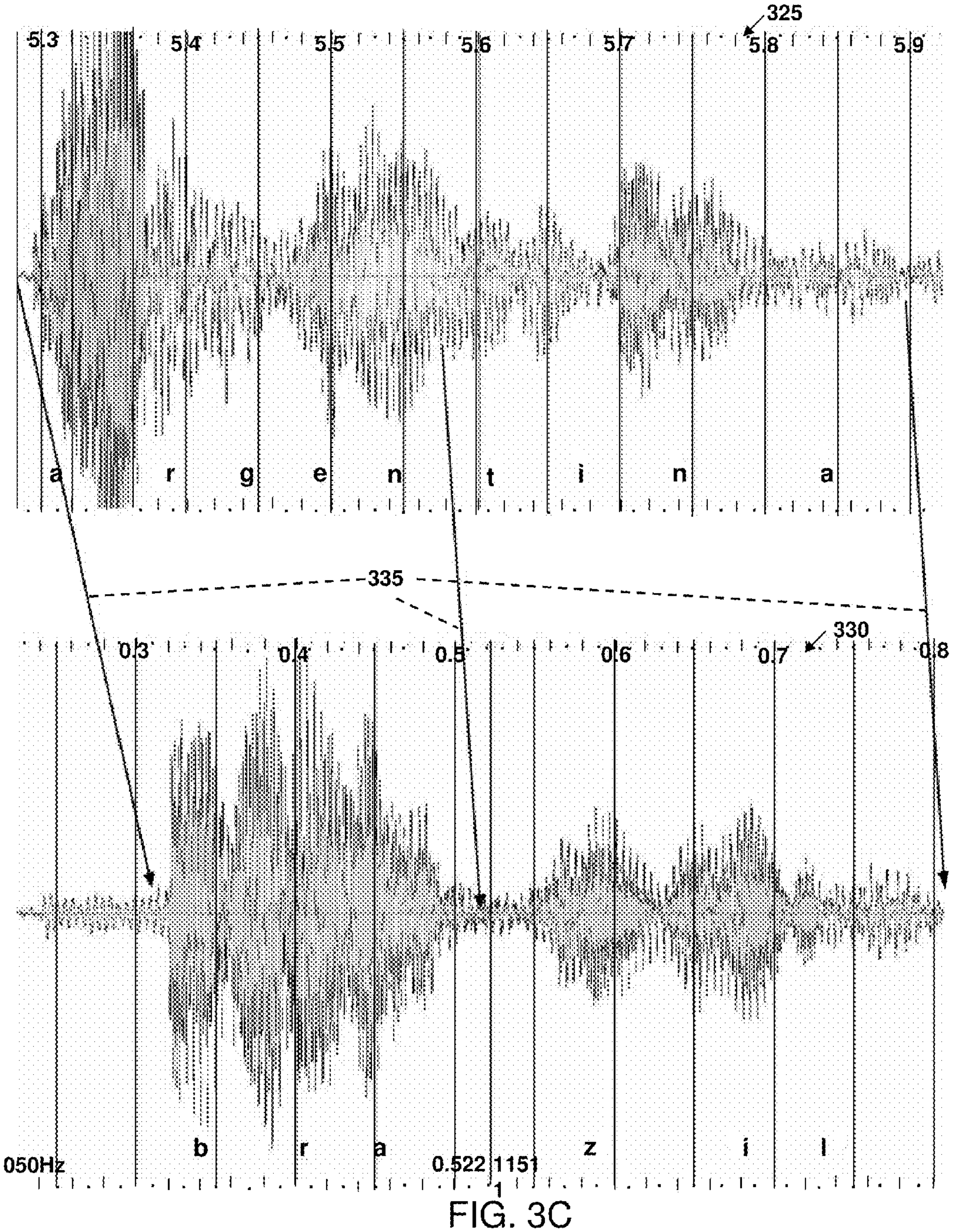
FIG. 3*c* is a graphical representation illustrating syllable mapping of the second word, for example Argentina, in the second audio and of the first instance of the first word, for example Brazil, in the in the file having audio, in accordance with one embodiment.

FIG. 3*c* is a graphical representation illustrating syllable mapping of the second word, for example Argentina, in the second audio and of the first instance of the first word, for example Brazil, in the in the file having audio, in accordance with one embodiment. The first word Brazil and the second word Japan have different number of syllables. A waveform 325 corresponds to the second audio of the second word and a waveform 330 corresponds to the first instance of the first word. The waveform 325 and the waveform 330 have different set of properties, for example the waveform 330 corresponds to the first instance of the first word spoken by the female speaker and the waveform 325 corresponds to the second word spoken by the male speaker. Arrows 335 indicates mapping of points in the waveform 325 to that in the waveform 330 using the transformations to yield a transformed second word.

Figure 4:
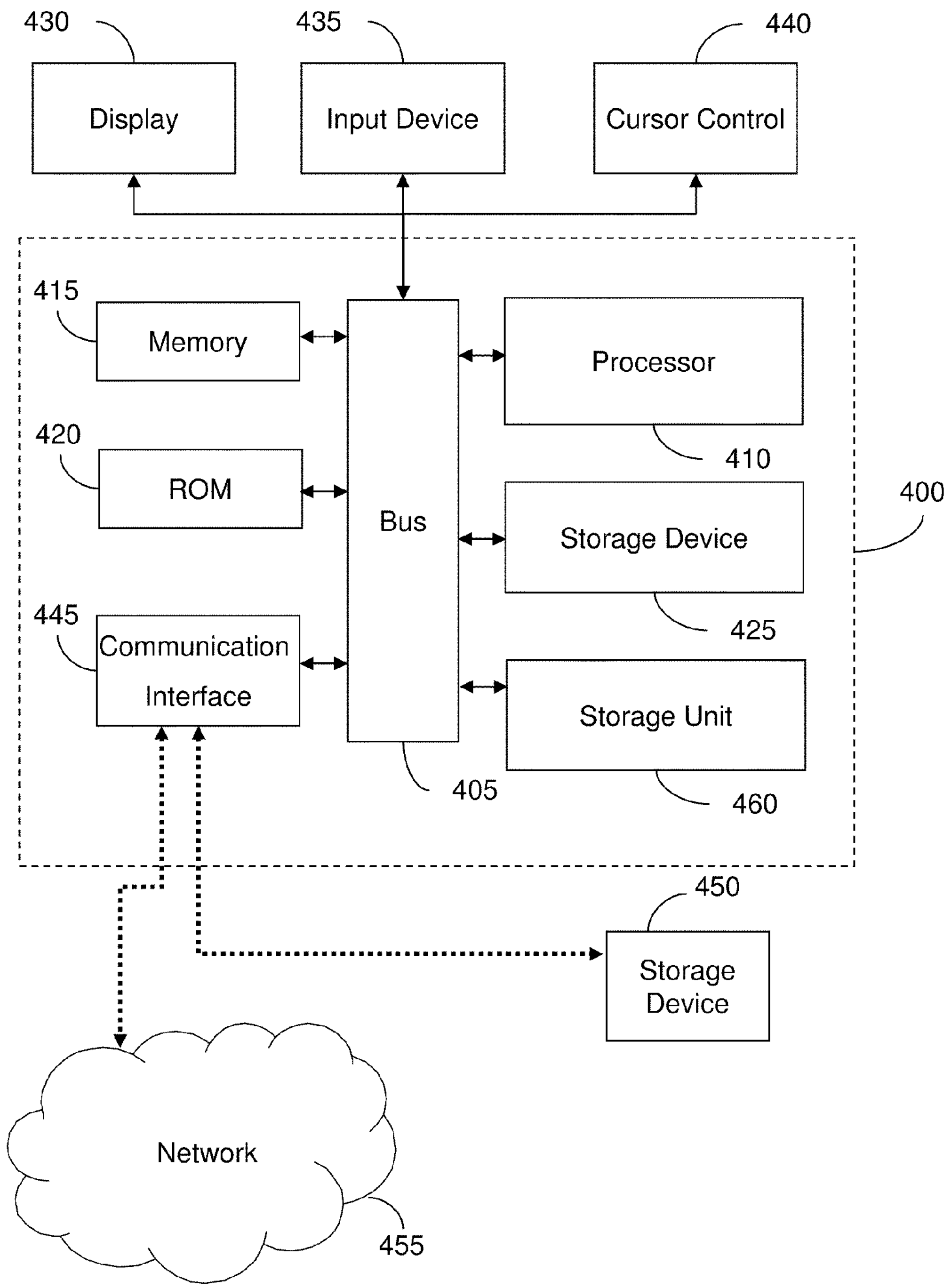
FIG. 4 is a block diagram of a system, in accordance with one embodiment.

FIG. 4 is a block diagram of a system 400. Examples of the system 400 include, but are not limited to, a computer, a server, and a mobile. The system 400 includes a bus 405 or other communication mechanism for communicating information, and a processor 410 coupled with the bus 405 for processing information. The system 400 also includes a memory 415, such as a random access memory (RAM) or other dynamic storage unit, coupled to the bus 405 for storing information and instructions to be executed by the processor 410. The memory 415 can be used for storing temporary variables or other intermediate information during execution of instructions to be executed by the processor 410. The system 400 further includes a read only memory (ROM) 420 or other static storage unit coupled to bus 405 for storing static information and instructions for processor 410. A storage device 425, such as a magnetic disk or hard disk, can be provided and coupled to the bus 405 for storing information.

The system 400 can be coupled via the bus 405 to a display 430, such as a cathode ray tube (CRT), for displaying information to a user. An input device 435, including alphanumeric and other keys, is coupled to bus 405 for communicating information and command selections to the processor 410. Another type of user input device is a cursor control 440, such as a mouse, a trackball, or cursor direction keys for communicating direction information and command selections to the processor 410 and for controlling cursor movement on the display 430. The functioning of the input device 435 can also be performed using the display 430, for example a touch screen.

The system 400 is also coupled to or includes a hardware element, for example a microphone, capable of providing an audio input to the processor 410. The audio input includes the first audio of the first word and the second audio of the second word. The system 400 can be coupled to the hardware element using a communication interface 445, which can be a port. In some embodiments, text inputs can be provided and the text inputs can be converted into audio signals using a text to audio conversion technique. Various software or hardware elements can be used for text to audio conversion. The audio signals generated from the text can be provided to the processor 410 using at least one of the communication interface 445 and the bus 405.

The audio input can also be provided through communication interface 445 and a network 455. The communication interface 445 provides a two-way data communication and couples the system 400 to the network 455. For example, the communication interface 445 can be an integrated services digital network (ISDN) card or a modem to provide a data communication connection to a corresponding type of telephone line. As another example, the communication interface 445 can be a local area network (LAN) card to provide a data communication connection to a compatible LAN. Wireless links can also be implemented. The communication interface 445 can also be a Bluetooth port, infrared port, Zigbee port, universal serial bus port or a combination. In any such implementation, the communication interface 455 sends and receives electrical, electromagnetic or optical signals that carry digital data streams representing various types of information. The audio input can also be accessed from the storage device 425 present inside the system 400 or from a storage device 450 external to the system 400. The devices, for example the storage device 425, the storage device 450, a storage unit 460, and the microphone, from which the audio input can be accessed or received, can be referred to as the hardware element. Similarly, the file having audio in which a replacement is desired can be accessed through any of the devices.

Various embodiments are related to the use of system 400 for implementing the techniques described herein, for example in FIG. 1 and FIG. 2. The techniques can be performed by the system 400 in response to the processor 410 executing instructions included in the memory 415. The instructions can be read into the memory 425 from another machine-readable medium, such as a storage unit 460 or the storage device 425. Execution of the instructions included in the memory 415 causes the processor 410 to perform the techniques described herein.

The term "machine-readable medium" as used herein refers to any medium that participates in providing data that causes a machine to operate in a specific fashion. In one embodiment implemented using the system 400, various machine-readable media are involved, for example, in providing instructions to the processor 410 for execution. The machine-readable medium can be a storage medium. Storage media include both non-volatile media and volatile media. Non-volatile media include, for example, optical or magnetic disks, for example the storage unit 460. Volatile media include dynamic memory, such as the memory 415. All such media must be tangible to enable the instructions carried by the media to be detected by a physical mechanism that reads the instructions into a machine.

Common forms of machine-readable medium include, for example, a floppy disk, a flexible disk, a hard disk, a magnetic tape, any other magnetic medium, a CD-ROM, any other optical medium, punchcards, papertape, any other physical medium with patterns of holes, a PROM, and EPROM, a FLASH-EPROM, any other memory chip or cartridge.

In some embodiments, the machine-readable medium can be transmission media including coaxial cables, copper wire and fiber optics, including the wires that include the bus 405. Transmission media can also take the form of acoustic or light waves, such as those generated during radio-wave and infra-red data communications. Examples of machine-readable medium may include but are not limited to carrier waves as describer hereinafter or any other media from which the system 400 can read, for example online software, download links, installation links, and online links. For example, the instructions can initially be carried on a magnetic disk of a remote computer. The remote computer can load the instructions into its dynamic memory and send the instructions over a telephone line using a modem. A modem local to the system 400 can receive the data on the telephone line and use an infra-red transmitter to convert the data to an infra-red signal. An infra-red detector can receive the data carried in the infra-red signal and appropriate circuitry can place the data on the bus 405. The bus 405 carries the data to the memory 415, from which the processor 410 retrieves and executes the instructions. The instructions received by the memory 415 can optionally be stored on storage unit 460 either before or after execution by the processor 410. All such media must be tangible to enable the instructions carried by the media to be detected by a physical mechanism that reads the instructions into a machine.

The audio input can be received or accessed by the processor 410 in response to an input from a user. For example, a user can select the file having audio in which a replacement is desired. The user can also provide text inputs or the audio input using which replacement is to be performed. A user interface can also be provided to the user to provide or specify path of the audios of the first word and the second word, and the file in which replacement is desired. The processor 410 then identifies the first syllable in the first audio of the first word and the second syllable in the second audio of the second word; detects the first syllable in the first instance of the first word in the file having audio; determines the transformations for transforming the first set of properties of the first syllable in the first audio to the third set of properties in the first syllable in the first instance of the first word; applies the transformations to the second set of properties of the second syllable to yield a transformed second syllable; and replaces the first syllable in the first instance of the first word with the transformed second syllable in the file having audio.

The processor 410 also identifies a third syllable in the second audio of the second word, the third syllable having a fourth set of properties; applies the transformations to the fourth set of properties of the third syllable to yield a transformed third syllable; and replaces the first instance of the first word with the transformed second syllable and the transformed third syllable. The processor 410 performs the steps till one or more syllables in the first instance of the first word are replaced by one or more syllable in the second word. Further, the processor 410 performs the steps for various instances of the first word in the file having audio.

In some embodiments, the processor 410 can include one or more processing units for performing one or more functions of the processor 410. The processing units are hardware circuitry performing specified functions.

Various embodiments can have various use cases. Few examples of the use cases include:

Use Case 1

Replacing offensive language with gentler alternatives in online or stored media files. Online media files can be accessed and the replacement action can be specified by a user. A server supporting the media files can then perform the replacement desired by the user.

Use Case 2

Substituting a friend's name in a song or dialogue and sharing the substituted version with the friend.

Use Case 3

Editing media files to remove errors.

Various embodiments enable replacement of an audio portion with another while preserving the properties and characteristics of the audio portion to a maximal extent.

While exemplary embodiments of the present disclosure have been disclosed, the present disclosure may be practiced in other ways. Various modifications and enhancements may be made without departing from the scope of the present disclosure. The present disclosure is to be limited only by the claims.

What is claimed is:

1. A method comprising:

identifying, electronically, a first syllable in a first audio of a first word and a second syllable in a second audio of a second word, the first syllable having a first set of properties and the second syllable having a second set of properties;

detecting, electronically, the first syllable in a first instance of the first word in a file having audio, the first syllable in the first instance of the first word having a third set of properties;

determining, electronically, one or more transformations for transforming the first set of properties of the first syllable in the first audio to the third set of properties in the first syllable in the first instance of the first word;

applying, electronically, the one or more transformations to the second set of properties of the second syllable to yield a transformed second syllable; and replacing, electronically, the first syllable in the first instance of the first word with the transformed second syllable in the file having audio.

2. The method as claimed in claim 1, wherein each set of properties comprises at least one of:

amplitude;

frequency; and time duration.

3. The method as claimed in claim 1, wherein applying the one or more transformations comprises at least one of:

altering amplitude associated with the second syllable;

altering frequency associated with the second syllable; and altering time duration associated with the second syllable.

4. The method as claimed in claim 1 and further comprising:

identifying a third syllable in the second audio of the second word, the third syllable having a fourth set of properties;

applying the one or more transformations to the fourth set of properties of the third syllable to yield a transformed third syllable; and replacing the first instance of the first word with the transformed second syllable and the transformed third syllable.

5. The method as claimed in claim 1 and further comprising:

repeating step of identifying for each syllable in the first audio of the first word and in the second audio of the second word;

repeating steps of detecting and determining for each syllable in the first audio of the first word, and for each instance of the first word in the file having audio; and repeating steps of applying and replacing for each syllable in the second audio of the second word, and for each instance of the first word in the file having audio.

6. An article of manufacture comprising:

a machine-readable medium; and instructions carried by the machine-readable medium and operable to cause a programmable processor to perform:

identifying a first syllable in a first audio of a first word and a second syllable in a second audio of a second word, the first syllable having a first set of properties and the second syllable having a second set of properties;

detecting the first syllable in a first instance of the first word in a file having audio, the first syllable in the first instance of the first word having a third set of properties;

determining one or more transformations for transforming the first set of properties of the first syllable in the first audio to the third set of properties in the first syllable in the first instance of the first word;

applying the one or more transformations to the second set of properties of the second syllable to yield a transformed second syllable; and replacing the first syllable in the first instance of the first word with the transformed second syllable in the file having audio.

7. The article of manufacture of claim 6, wherein each set of properties comprises at least one of:

amplitude;

frequency; and time duration.

8. The article of manufacture of claim 6, wherein applying the one or more transformations comprises at least one of:

altering amplitude associated with the second syllable;

altering frequency associated with the second syllable; and altering time duration associated with the second syllable.

9. The article of manufacture of claim 6 and further comprising instructions operable to cause the programmable processor to perform:

identifying a third syllable in the second audio of the second word, the third syllable having a fourth set of properties;

applying the one or more transformations to the fourth set of properties of the third syllable to yield a transformed third syllable; and replacing the first instance of the first word with the transformed second syllable and the transformed third syllable.

10. The article of manufacture of claim 6 and further comprising instructions operable to cause the programmable processor to perform:

repeating step of identifying for each syllable in the first audio of the first word and in the second audio of the second word;

repeating steps of detecting and determining for each syllable in the first audio of the first word, and for each instance of the first word in the file having audio; and repeating steps of applying and replacing for each syllable in the second audio of the second word, and for each instance of the first word in the file having audio.

11. A system comprising:

a communication interface in electronic communication with a hardware element to receive an audio input comprising a first word and a second word;

a storage device that stores a file having audio; and a processor responsive to the audio input to:

identify a first syllable in a first audio of the first word and a second syllable in a second audio of the second word, the first syllable having a first set of properties and the second syllable having a second set of properties;

detect the first syllable in a first instance of the first word in the file having audio, the first syllable in the first instance of the first word having a third set of properties;

determine one or more transformations for transforming the first set of properties of the first syllable in the first audio to the third set of properties in the first syllable in the first instance of the first word;

apply the one or more transformations to the second set of properties of the second syllable to yield a transformed second syllable; and replace the first syllable in the first instance of the first word with the transformed second syllable in the file having audio.

12. The system as claimed in claim 11, wherein the processor is responsive to the audio input to further:

identify a third syllable in the second audio of the second word, the third syllable having a fourth set of properties;

apply the one or more transformations to the fourth set of properties of the third syllable to yield a transformed third syllable; and replace the first instance of the first word with the transformed second syllable and the transformed third syllable.

13. The system as claimed in claim 11, wherein the processor is responsive to the audio input to further:

repeat step of identifying for each syllable in the first audio of the first word and in the second audio of the second word;

repeat steps of detecting and determining for each syllable in the first audio of the first word, and for each instance of the first word in the file having audio; and repeat steps of applying and replacing for each syllable in the second audio of the second word, and for each instance of the first word in the file having audio.

14. A method comprising:

receiving, electronically, a first audio of a first word and a second audio of a second word;

detecting, electronically, at least one instance of the first word in a file having audio;

applying, electronically, properties associated with the at least one instance of the first word in the file having audio to the second word based on the first audio; and replacing, electronically, the at least one instance of the first word in the file having audio with the second word having applied properties.

15. The method as claimed in claim 14 and further comprising:

identifying, electronically, at least one syllable in the first audio of the first word and at least one syllable in the second audio of the second word.

16. The method as claimed in claim 15, wherein the detecting comprises detecting, electronically, at least one syllable in the at least one instance of the first word in the file having audio.

17. The method as claimed in claim 16, wherein the applying comprises:

determining, electronically, one or more transformations for transforming the at least one syllable in the first audio of the first word to the at least one syllable in the at least one instance of the first word in the file having audio;

applying, electronically, the one or more transformations to the at least one syllable in the second audio of the second word.

18. The method as claimed in claim 17, wherein the replacing comprises replacing, electronically, the at least one syllable in the at least one instance of the first word in the file having audio with the at least one syllable in the second audio of the second word.

19. The method as claimed in claim 17, wherein applying the one or more transformations comprises at least one of:

altering amplitude associated with the at least one syllable in the second audio of the second word;

altering frequency associated with the at least one syllable in the second audio of the second word; and altering time duration associated with the at least one syllable in the second audio of the second word.

* * * * *